United States Patent [19]
Chen et al.

[11] Patent Number: 5,991,012
[45] Date of Patent: Nov. 23, 1999

[54] EYESAFE LASER TRANSMITTER WITH BREWSTER ANGLE Q-SWITCH IN SINGLE RESONATOR CAVITY FOR BOTH PUMP LASER AND OPTICAL PARAMETRIC OSCILLATOR

[75] Inventors: Tzeng S. Chen, Rancho Palos Verdes; Robert D. Stultz, Bellflower, both of Calif.

[73] Assignee: Raytheon Company, Lexington, Mass.

[21] Appl. No.: 09/136,634

[22] Filed: Aug. 19, 1998

Related U.S. Application Data

[60] Division of application No. 08/845,267, Apr. 24, 1997, Pat. No. 5,841,798, and a continuation-in-part of application No. 08/646,200, May 7, 1996, Pat. No. 5,687,186.

[51] Int. Cl.$^6$ .................................. G01C 3/08; H01S 3/10

[52] U.S. Cl. ............................... 356/5.01; 356/5.1; 372/11

[58] Field of Search ................................ 372/92, 11, 21; 356/5.01, 5.15

[56] References Cited

U.S. PATENT DOCUMENTS

| 5,377,219 | 12/1994 | Geiger | 372/97 |
|---|---|---|---|
| 5,390,211 | 2/1995 | Clark et al. | 372/95 |
| 5,457,707 | 10/1995 | Sobey et al. | 372/20 |
| 5,852,492 | 12/1998 | Nimblett et al. | 356/5.04 |

Primary Examiner—Stephen C. Buczinski
Attorney, Agent, or Firm—Colin M. Raufer; Leonard A. Alkov; Glenn H. Lenzen, Jr.

[57] ABSTRACT

An eyesafe laser (10) transmitter having a single resonator cavity (16) for both the pump laser and the optical parametric oscillator (22). A Nd:YAG rod (24) provides gain for light at a first wavelength. A combined Q-switch/Brewster plate (26) Q-switches the light to increase its intensity and polarizes the light so that its polarization plane is perpendicular to the Z-axis of a KTP crystal functioning as the optical parametric oscillator, thereby providing type II phase matching conditions. The optical parametric oscillator transforms the light at the first wavelength to light at a second wavelength which is output thorough a partially reflective outcoupler at a wavelength which will not harm the eyes.

1 Claim, 3 Drawing Sheets

EYESAFE LASER TRANSMITTER WITH BREWSTER ANGLE Q-SWITCH IN SINGLE RESONATOR CAVITY FOR BOTH PUMP LASER AND OPTICAL PARAMETRIC OSCILLATOR

CROSS REFERENCE TO RELATED APPLICATION

This is a division of application Ser. No. 08/845,267 filed Apr. 24, 1997, now U.S. Pat. No. 5,841,798, and a continuation in part of commonly assigned application entitled "EYESAFE LASER TRANSMITTER WITH SINGLE RESONATOR CAVITY FOR BOTH PUMP LASER AND OPTICAL PARAMETRIC OSCILLATOR", which was filed on May 7, 1996 under Ser. No. 08/646,200, now U.S. Pat. No. 5,687,186, and which is hereby incorporated in its entirety by reference.

BACKGROUND OF THE INVENTION

1. Field of the Invention

This invention relates to laser systems which include an optical parametric oscillator to shift the wavelength of light emitted by the laser and, more particularly, to a laser system which utilizes the same optical resonator cavity for both the pump laser and the optical parametric oscillator.

2. Prior Art

Eyesafe laser transmitters of the type discussed herein typically include two resonator cavities. A first resonator cavity operates in conjunction with a pump laser operating at a pump frequency, and a second resonator cavity operates in conjunction with an optical parametric oscillator (OPO) which converts the pump frequency output of the laser to an eyesafe frequency. The two resonator configuration requires a total of three resonator mirrors for operation of the laser. The use of three resonator mirrors significantly complicates alignment of the mirrors.

In addition to alignment considerations, typical eyesafe lasers include a relatively short OPO cavity which results in high Fresnel numbers, thereby reducing the overall quality of the laser beam. Further, the spatial overlap of these cavities is often significantly limited by the present arrangements.

An uncoated $U^{4+}:SrF_2$ Q switch aligned at Brewster's angle has been demonstrated in the resonator cavity of an Er:glass laser operating at an eyesafe frequency (1533 nm).

SUMMARY OF THE INVENTION

According to the present invention, an eyesafe laser system comprises a single resonator cavity having a partially reflective surface on at least one end for at least partially reflecting light of a first. (pumping) wavelength and of a second (eyesafe) wavelength within the resonator cavity and for at least partially transmitting light of the second wavelength from the resonator cavity. An optical parametric oscillator disposed within the resonator cavity converts light at the pumping frequency to light at an output frequency The optical parametric oscillator and the laser which provides the pumping frequency light are both housed within the resonator cavity, and the reflective surface (or surfaces) defining the resonator cavity are optically aligned along an optical axis with the laser and the optical parametric oscillator.

In some embodiments, the optical axis is folded, and a single partially reflective surface defines both ends of the resonator cavity. In other embodiments, the optical axis extends from the partially reflective surface to a second reflective surface at the other end of the cavity which is preferably reflective at both frequencies.

Preferably, a saturable absorber Q-switch is placed between the laser and the OPO, and is aligned at the Brewster angle with respect to the optical axis. By housing both the pump laser and the OPO within the same resonator cavity and by orienting the Q-switch such that it also functions as a Brewster plate polarizer, not only is it possible to simplify the design of the resonator cavity and facilitate the alignment of the optical elements therein, but also it is possible to increase the overall optical efficiency by reducing the number of surfaces and/or to reduce cost of manufacture by eliminating at least some of the anti-reflective coatings that would otherwise be required. The resultant OPO type laser system thus has fewer and simpler components and is cheaper and easier to manufacture and maintain.

Additional objects, features and advantages of the present invention will become apparent from the following description and the appended claims, taken in connection with the accompanying drawings.

DETAILED DESCRIPTION OF A PREFERRED EMBODIMENT

Figure 1:
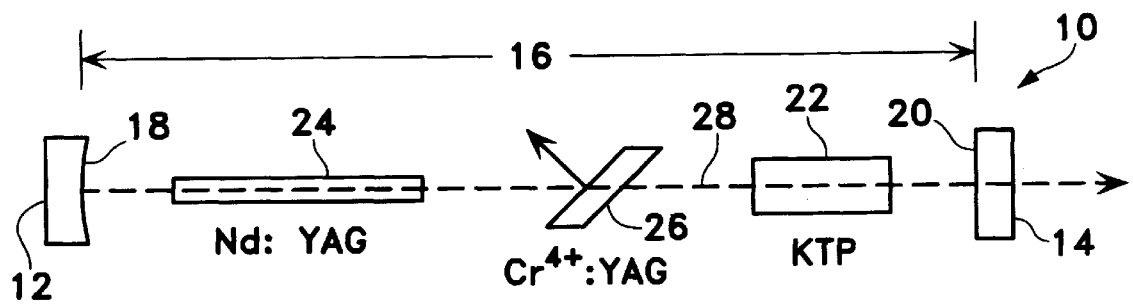
FIG. 1 is a laser system arranged in accordance with the principles of the present invention.

As shown in FIG. 1, the laser system 10 includes a first-mirror 12 and a second mirror 14 defining the ends of an optical cavity 16. Mirror 12 includes an interior convex surface 18 having a radius of curvature of 10 meters which is high-reflectivity coated (approximately 100%) to reflect light having a wavelength of 1.06 microns and also high reflectivity coated (approximately 88% ??) to reflect light having a wavelength of 1.57 microns. Mirror 14 includes a planar interior surface 20 which is high-reflectivity coated (approximately 100%) to reflect light having a wavelength of 1.06 microns and only partially reflectivity coated (approximately 46%) at a wavelength of 1.57 microns, to thereby function as an outcoupler for the eyesafe 1.57 micron output beam. The reflectivity coating of interior surfaces 18 and 20 of mirrors 12 and 14, respectively, coincides with the wavelengths of light emitted by the pump (1.06 microns) and the optical parametric oscillator 22 (1.57 microns). Mirrors 14 and 12 are separated by approximately 5 inches (14 cm). While shown as being 88% reflective of 1.57 microns, mirror 12 preferably is 100% reflective of 1.57 micron light.

Within the interior of the resonator cavity 16 a neodymium-doped yttrium aluminum garnet (Nd:YAG) rod 24 of dimensions 2.5 mm×50 mm is flashlamp-pumped. Preferably both the rod 24 and the lamp are enclosed within a reflective ceramic pump cavity. The rod 24 provides gain for light at a wavelength of 1.06 microns. The Q-switch 26 initially absorbs light at 1.06 microns until a predetermined amount of energy has been absorbed. Q-switch 26 then becomes relatively transparent, thereby resulting in the onset of laser action and subsequently causing the release of stored. energy as 1.06 micron light. Q-switch 26 is a 0.54 optical density $Cr^{4+}$:YAG crystal oriented at its Brewster angle (61.2°) with respect to optical axis 28 connecting the various elements of the laser resonator 10 and functions as a Brewster polarizing plate, whereby the 1.06 micron light is linearly polarized. The polarized 1.06 micron light, after reaching sufficient intensity, is converted to 1.57 micron light by the optical parametric oscillator (OPO) 22. The OPO 22 includes as the active element a potassium titanyl phosphate (KTP) crystal having its Z-axis shown as projecting outward from the plane of FIG. 1. This KTP crystal orientation, as well as the orientation of the Brewster plate 26 relative to the optical axis 28, provide type II phase matching conditions for KTP in which the 1.06 micron input and 1.57 micron output are both linearly polarized in the plane of FIG. 1 (ie, are perpendicular to the Z-axis of the KTP). Thus, it can be seen from FIG. 1 that the optical pa+rametric oscillator 22 and Nd:YAG rod 24 share a common resonator cavity 16. The surfaces of rod 24 and OPO 22 are preferably anti-reflective coated to improve transmission at both 1.06 microns and 1.57 microns. It will be noted by one skilled in the art that the reflective coatings applied to interior surface 20 of mirror 14 may be directly applied. to the output side of OPO 22, thereby eliminating mirror 14. Furthermore, although in the depicted embodiment the combined Q-switch/Brewster plate 26 was not anti-reflection coated, it would also be functional with such a coating, albeit with some loss of efficiency.

Figure 2:
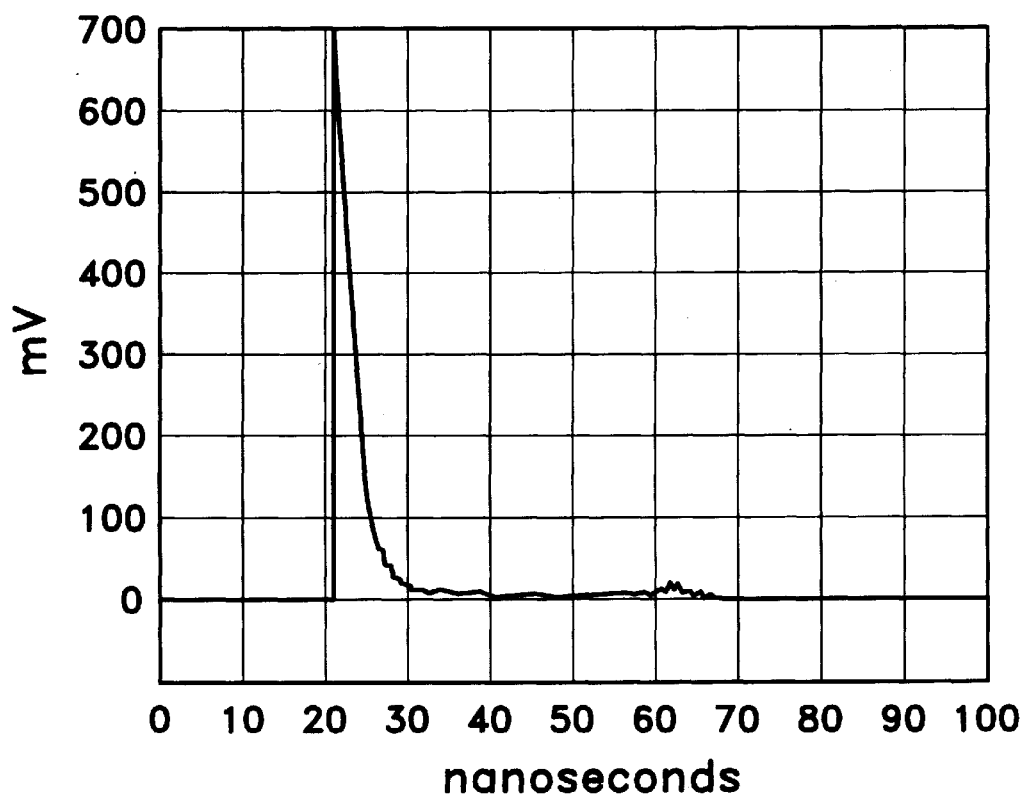
FIG. 2 is a plot of a typical 1.57 μm pulse output from the laser system of FIG. 1.

In operation, the Nd:YAG rod 24 is flashlamp-pumped or diode-pumped. The 1.06 micron light is Q-switched using a low transmittance 0.54 optical density tetravalent-doped chromium yttrium aluminum garnet ($Cr^{4+}$:YAG) crystal. The threshold for the laser in FIG. 1 using this Q-switch, is about 3.6 Joules of electrical energy input to the flashlamp. In the embodiment described in FIG. 1, approximately 1 milliJoule of output energy is emitted from mirror 14 in the form of 1.57 micron light. FIG. 2 depicts a typical 1.57 micron pulse observed with the laser resonator of FIG. 1.

Figure 3:
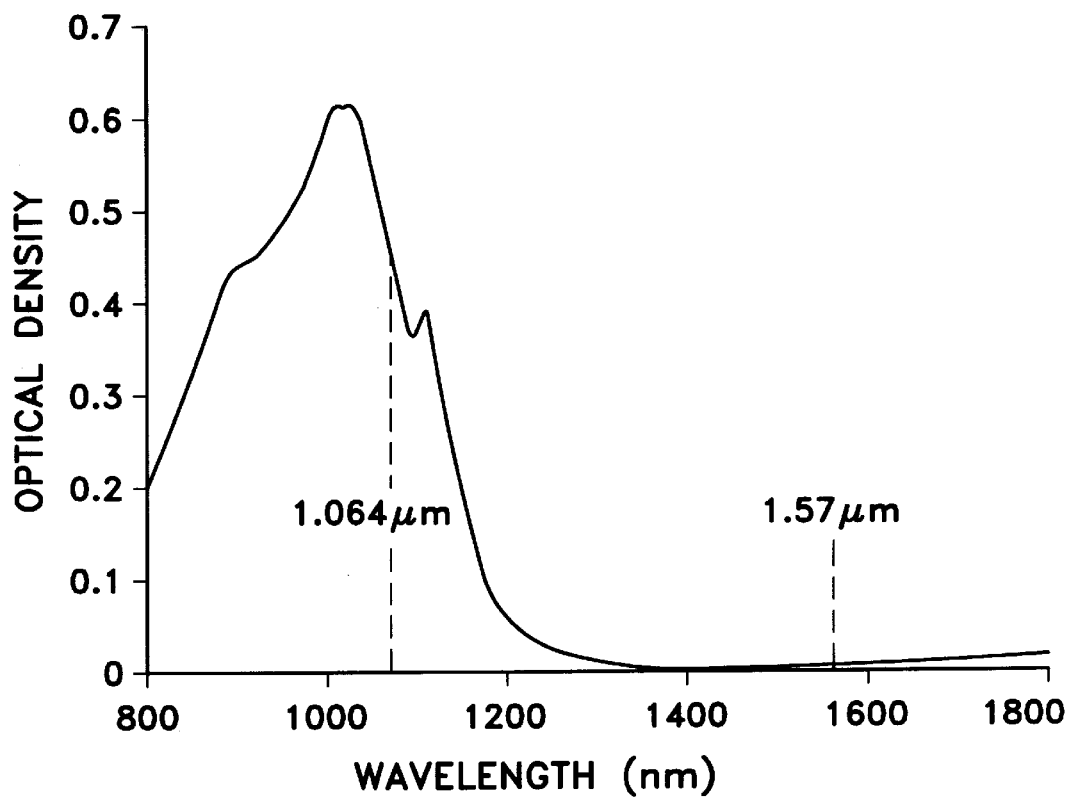
FIG. 3 is a plot of the absorption spectrum of the $Cr^{4+}$:YAG Q-switch shown in FIG. 1.
Figure 4:
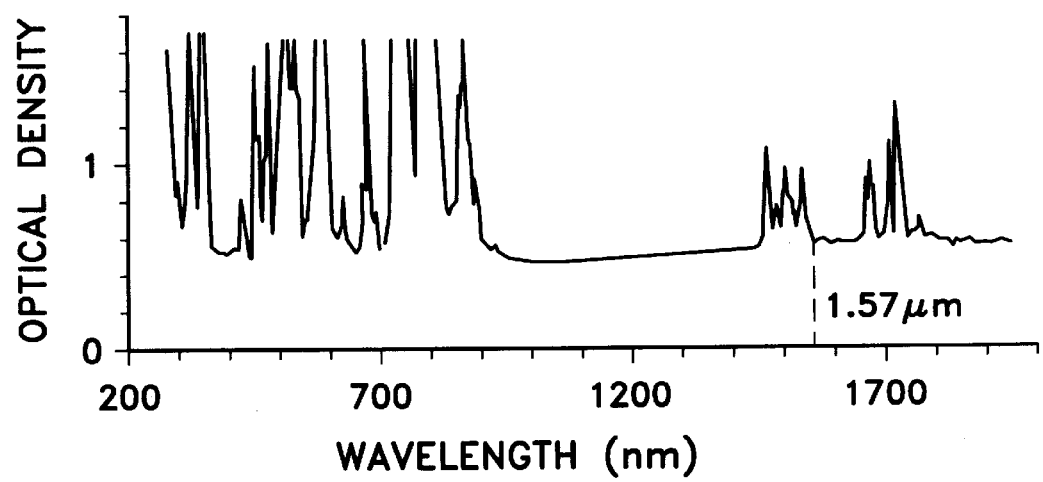
FIG. 4 is a plot of the absorption spectrum of the Nd:YAG.

The low intrinsic losses of both the $Cr^4$:YAG and $Nd^+$:YAG at the optical parametric oscillator signal wavelength can be seen in the absorption spectra of FIGS. 3 and 4, respectively. Of particular importance with respect to FIGS. 3 and 4 is the relatively low loss at the 1.57 micron wavelength in both the $Cr^{4+}$:YAG and $Nd^+$:YAG crystals.

Figure 5:
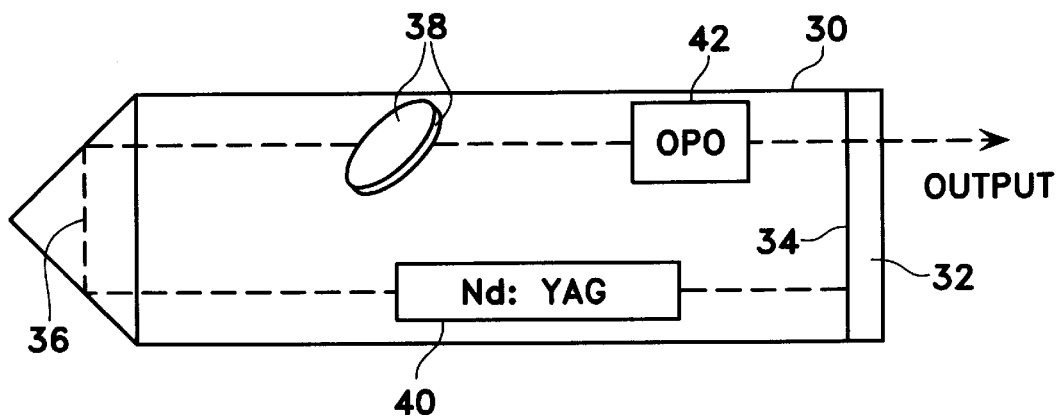
FIG. 5 is a second embodiment of the laser arranged in accordance with the principles of the present. invention.

FIG. 5 depicts an alternative embodiment of an eyesafe laser utilizing the single optical cavity concept. The resonator cavity 30 includes a single mirror 32 having deposited on an interior surface 34 a high reflectivity mirror coating to totally reflect the pump light at a wavelength of 1.06 microns and to partially reflect the output light at a wavelength of 1.57 microns. The resonator cavity 30 also includes a corner cube folding prism 36 which enables a single mirror design. The combined Q-switch/Brewster plate 38 is a $Cr^{4+}$:YAG crystal extending across the upper leg of the folded resonator cavity 30. The Nd:YAG rod 40 is flashlamp-pumped. The rod 40 provides gain for light at a wavelength of 1.06 microns. Combined Q-switch/Brewster plate 38 operates as described with respect to FIG. 1 to absorb light at 1.06 microns, then release the stored energy subsequent to the onset of laser action linearly polarized in the plane of the Figure. OPO 42 includes a KTP crystal and converts the 1.06 micron light, after it reaches a sufficient intensity, to 1.57 micron light. The 1.57 micron light is then partially transmitted through the mirror 32 to provide an eyesafe output laser beam.

Figure 6:
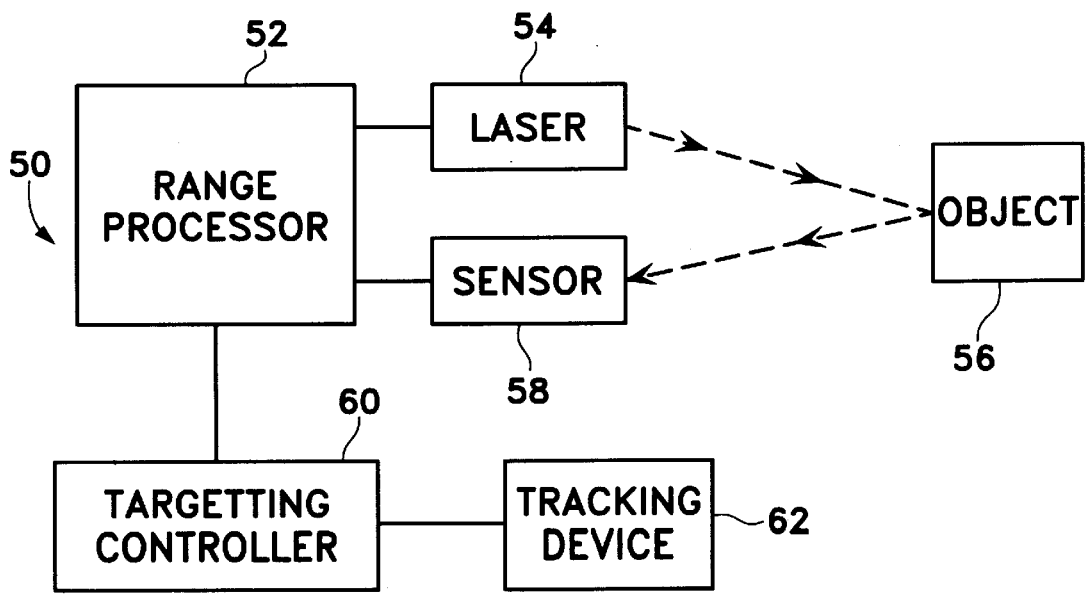
FIG. 6 is a block diagram for a range processing system using the laser described in the present invention.

With reference to FIG. 6, a targeting system 50 is shown which includes one of the laser as described in FIGS. 1 and 5. The targeting system 50 includes a range processor 52. Range processor 52 provides control signals to a laser 54, which may be any of the lasers as described with respect to FIGS. 1 and 4–6. The laser 54 outputs a single (or repeated) pulse directed to an object 56 which has been selected for targeting. The laser pulse reflects off of object 56 back in the direction of the laser 54. A sensor 58 detects the reflected pulse. The sensor 58 provides an input signal to range processor 52. Range processor 52 then determines the distance between the laser 54/sensor 58 and the object 56.

Range processor 52 determines the distance in accordance with the time differential between the sending of the pulse by laser 54 and the receiving of the pulse by sensor 58. Range processor 52 then computes the distance and outputs the distance to targeting controlling 60. Targeting controller 60 then determines a targeting solution in accordance with the distance provided by range processor 52 and other inputs (not shown). Targeting controller then outputs the targeting solution to a tracking device 62 whose orientation may be controlled by targeting controller 60 in accordance with the range information provided by range processor 52.

Several important aspects of the invention will now be discussed.

It will be noted by one skilled in the art, that with respect to FIG. 1, mirrors 12 and 14, resonator cavity 16, and Nd:YAG rod 24 define a pump laser. The Nd:YAG rod provides the gain medium for the pump laser.

It will be understood by one skilled in the art that when a mirror coating is applied to the output side of the OPO, that mirror coating also comprises part of the pump laser.

It will further be understood by those skilled in the art that materials other than Nd:YAG may be substituted therefor. For example, either of the materials yttrium ortho-vanadate ($Nd_3$: $YVO_4$) or YLF ($Nd^{3+}$:$LiYS_4$) may be readily substituted for the Nd:YAG rod. These materials provide properties differing from the Nd:YAG which may be attractive in particular applications of the invention. In general, the rod may include one of 3 the following materials Nd, $Nd^{3+}$, and $Yb^{3+}$.

Similarly, with respect to the OPO, other nonlinear crystals may be substituted for the KTP crystal. Examples of acceptable substitutes may include potassium titanyl arsenate (KTA), rubidium titanyl arsenate (RTA), potassium rubidium titanyl arsenate (KRTA), and the like. These various crystals generally share the common property that they can shift an incoming wavelength to an eyesafe, typically 1 to 1–1½ microns, in a non-critically matched phase condition but having a selection of crystal available provides greater flexibility in the design of lasers for particular applications.

Further, as stated above with respect to FIG. 1, diode-pumping of the pump laser may be used as an alternative to the flash lamp-pumping, as described.

From the foregoing, it can be seen that the same optical resonator cavity may be used for both the pump laser and the optical parametric oscillator and that the same crystal may be used as both the Q-switch and as the polarizer, thereby providing a particularly simple configuration which is relatively easy to align and which operates with a relatively high efficiency.

Although the invention has been described with particular reference to certain preferred embodiments thereof, variations and modifications can be effected within the spirit and scope of the following claims.

What is claimed is:

1. A range finding system for determining a distance to a target, comprising:

a laser having a pump laser for providing light at a pumping frequency and an optical parametric oscillator for converting light at the pumping frequency to light at an output frequency;

a controller for causing the laser to emit light at the output frequency in the general direction of the target;

a sensor for detecting light reflected from the target;

a computer for determining the distance of the target object in accordance with a time difference between emission of the light by the laser and detection of reflected light by the sensor; wherein both the pump laser and the optical parametric oscillator are disposed within a single resonator cavity along an optical path including a saturable absorber having a surface aligned at an associated Brewster Angle with respect to the optical path; and the optical parametric oscillator is aligned with one of its principal crystal axes parallel to the optical path such that only light of a predetermined polarization is transmitted in a non-critically phase matched condition from the pump laser to the optical parametric oscillator.

* * * * *